Jan. 13, 1970   A. G. VEITH ET AL   3,488,992
CUROMETER
Filed Sept. 25, 1967   3 Sheets-Sheet 1

INVENTORS
ALAN G. VEITH
ALFONSO W. MEHRBRODT
BY Joseph Januszkiewicz
ATTY.

Jan. 13, 1970   A. G. VEITH ET AL   3,488,992
CUROMETER
Filed Sept. 25, 1967   3 Sheets-Sheet 2
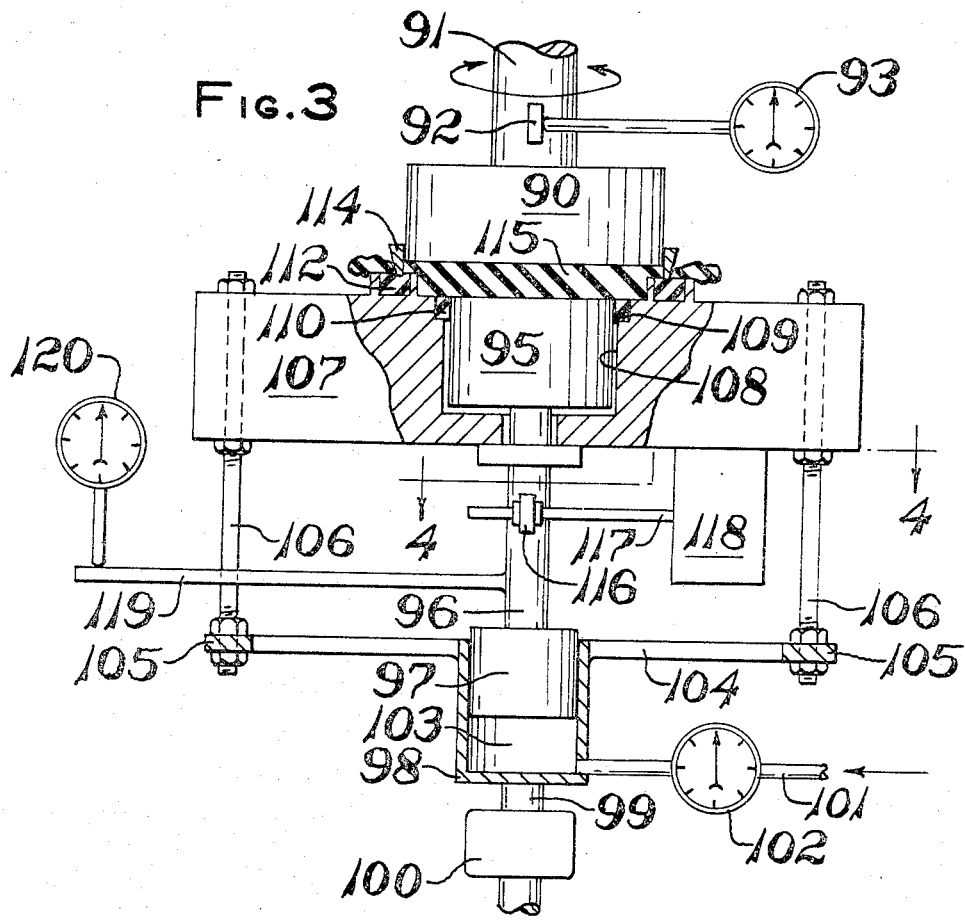
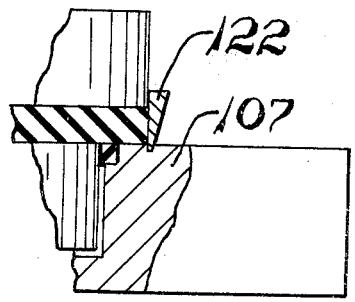
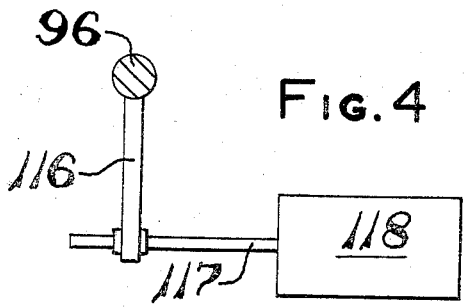
INVENTORS
ALAN G. VEITH
ALFONSO W. MEHRBRODT
BY Joseph Januszkiewicz
ATTY.

United States Patent Office 3,488,992
Patented Jan. 13, 1970

3,488,992
CUROMETER
Alan G. Veith, Copley, and Alfonso W. Mehrbrodt,
Brecksville, Ohio, assignors to The B. F. Goodrich
Company, New York, N.Y., a corporation of New
York
Filed Sept. 25, 1967, Ser. No. 670,209
Int. Cl. G01n 25/04
U.S. Cl. 73—15.6      16 Claims

ABSTRACT OF THE DISCLOSURE

A testing instrument comprising a pair of spaced plate members with planar serrated surfaces which encompass a sample of material to be tested wherein such spaced members are enclosed in a pressurized housing such that one of the spaced plate members is oscillated while the other plate member is movable into cooperative working engagement together with measuring means connected to the one member to register torque and to the other member for measuring load thereon and as an alternative to connect the torque and load measuring means solely to the other plate member to register load and torque exerted by the sample on to the plate member, thereby determining physical properties of solid and chemically blown elastomeric material.

BACKGROUND OF THE INVENTION

This invention relates to the field of testing devices and more particularly to the methods and apparatus for determining the shear stress-strain and related properties of vulcanizable elastomeric materials and reclaimed elastomers.

The classical methods and apparatus for testing physical properties of elastomeric materials is to take separate rubber specimens thereof and vulcanize such specimens to different states of cure and then perform individual tests thereon to ascertain their conditions and state. These techniques are disadvantageous in that it requires the testing of a large number of individually prepared specimens or samples, which is time consuming and not adaptable to production usage.

Various instruments develop for continuously testing and recording the change in characteristics of a rubber specimen throughout vulcanization have been developed for use; however, such test devices are not sufficiently flexible in use and have sufficient thermal lag to render certain derived cure rates as spurious. In addition the true shear modulus values were complicated by unpredictable variations in shear strain in the test chamber. While certain instruments determine compression modulus throughout vulcanization of the specimen under pressure, such instruments fail to measure dynamic properties. The Mooney viscometer while useful in determining scorch time is not applicable to determine the characteristics at other than the early stages of the cure. Other instruments use a pair of confining die members that encompass a specimen of test material with a driven rotor embedded therein on which the torque resistance is measured; however, such third member is not temperature controlled and promotes thermal lag.

SUMMARY OF THE INVENTION

The present invention provides a single test instrument that measures the complete shear stress-strain characteristic properties of elastomeric materials as well as of liquids while such materials are undergoing cure. Such instrument is highly accurate. The instrument provides a positive controlled heating of the sample of material without introducing error due to internal heat generated through friction in the material under test. Further, since such instrument utilizes but two confining elements and eliminates the rotor embedded in the test sample a highly accurate temperature control of the rubber is obtained with minimal thermal lag. The control of curing pressure is effected by an applied force on the specimen of material giving a uniform internal pressure condition during cure. In addition such instrument is particularly useful in a production set-up, operable by a relatively untrained person thereby achieving improved factory control.

The present invention contemplates the use of a pair of enclosed spaced members cooperative upon closure to define a pressurized cavity wherein one member is driven and the other member held stationary which members effectively encompass a specimen providing shear on the specimen as relative motion therebetween is effected. Sensing means is connected to the input and/or the output to record the change in the characteristic of the specimen.

FIGURE 3 is a modification of the apparatus shown in FIGURE 1 being a schematic side elevation view partly in section;

FIGURE 4 is a cross-sectional view taken along line 4—4 of FIGURE 3;

FIGURE 5 is a further modification of the apparatus shown in FIGURE 3, being a fragmentary side elevational view of such testing apparatus shown in FIGURE 3 illustrating a metal contact between the rotor plate and the stationary plate.

Figure 1:
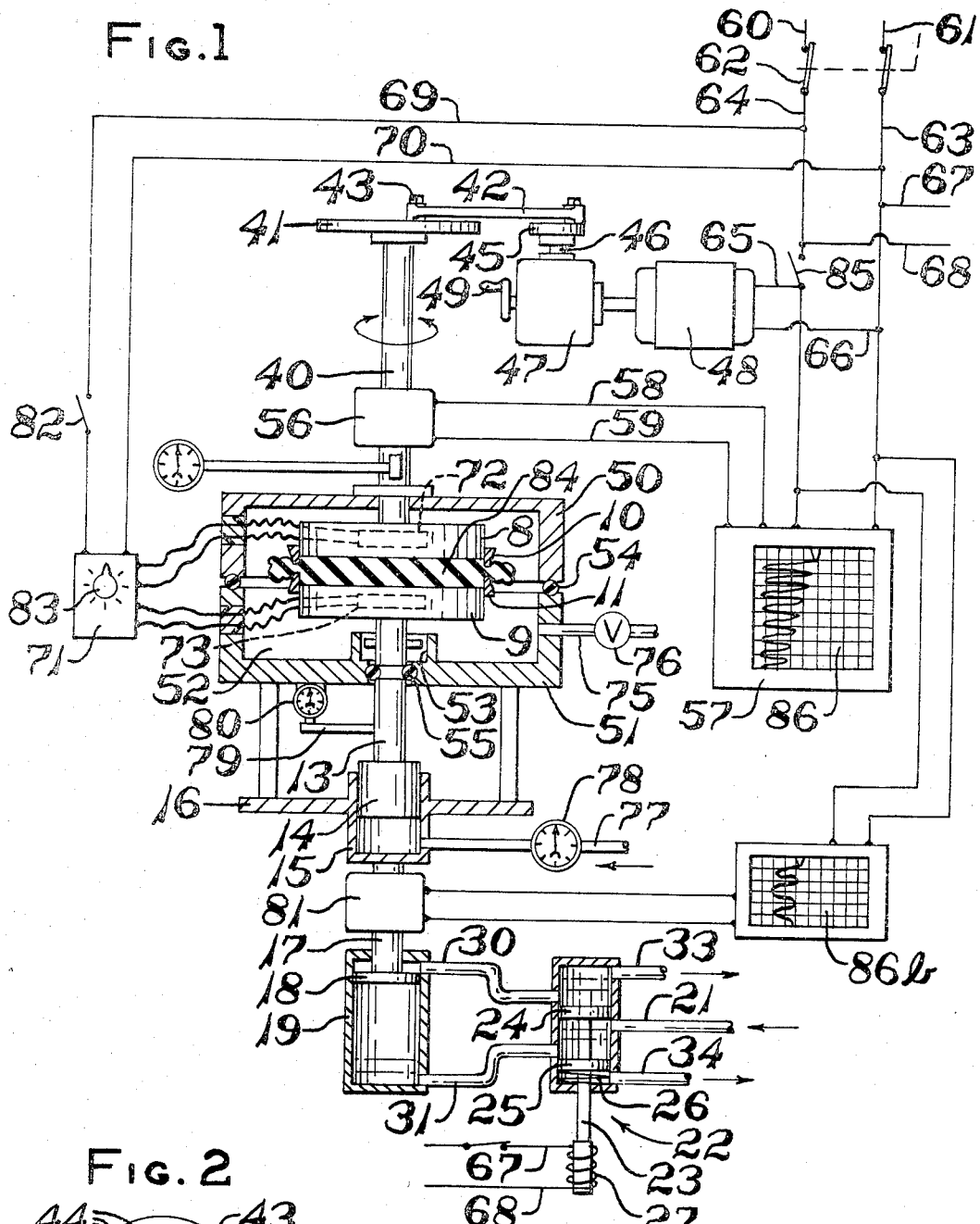
FIGURE 1 is a schematic front elevational view of the apparatus partly in section illustrating the relationship of various control elements in the apparatus.

Referring now to the drawings, wherein like reference characters designate like or corresponding parts throughout the several views, there is shown in FIGURE 1 upper and lower spaced serrated plate members 8 and 9 respectively. Each member 8 and 9 has an end ring 10 and 11 respectively which rings are adapted to firmly engage the outer portions of a sample to be tested to prevent outward displacement thereof during testing and prevent porous cure of such sample. Plate member 9 is mounted on one end of a vertical piston rod 13 which is attached to a piston 14 movable within a pressure cylinder 15, which cylinder 15 is secured to a bracket 16. Thus, as piston 14 moves within its cylinder 15, plate 9 may be moved toward or away from the plate 8. Frame member 16 along with the cylinder 15 is secured to a piston rod 17 which is attached to a piston 18 movable within a double acting pressure cylinder 19, which cylinder 19 is mounted on a suitable base not shown. Fluid for moving the piston 18 within its cylinder 19 is supplied from a suitable source not shown under pressure through a supply line 21 to a four-way, spring return solenoid valve 22. As shown in FIGURE 1, a piston rod 23 having a pair of spaced pistons 24 and 25 is spring biased upwardly as shown in FIGURE 1 by a spring 26. Piston rod 23 along with pistons 24 and 25 is movable in a downwardly direction by the energization of solenoid 27 in opposition to the spring 26. Fluid is either supplied to the cylinder 19 by means of lines 21, 30 and 31 and exhausted from the cylinder 19 via lines 30, 31 and lines 33 and 34 through valve 22. In the position shown (FIGURE 1) pressurized fluid is supplied to cylinder 19 to the chamber below piston 18 via lines 21 and 31 and exhausted from the chamber above piston 18 via lines 33 and 30.

Figure 2:
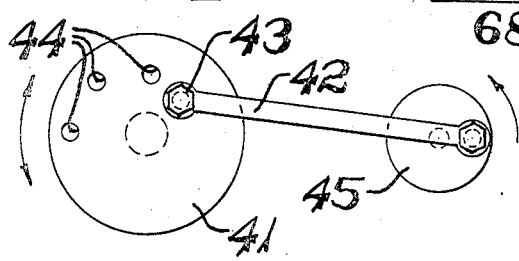
FIGURE 2 is a plan view of the connection between the drive wheels for oscillating the test plate.

Upper plate member 8 is secured to a vertically extending shaft 40 which has its upper end portion secured to a wheel member 41 for rotation therewith. As shown in FIGURES 1 and 2, one end of a crank member 42 is pivotably mounted by means of a movable pin 43 to wheel 41. As seen in FIGURE 2, wheel 41 has a plurality of pin receiving index holes 44, each at a different radial spacing from the vertical axis of wheel 41. An eccentric drive wheel 45 is mounted on an output shaft 46 of a variable speed reducer 47 driven by a motor 48. The other end portion of crank 42 is pivotally mounted to such eccentric drive wheel 45 to transfer the rotational movement of shaft 46 from speed reducer 47 to an oscillating motion in wheel 41 and shaft 40. The amplitude of the oscillation of wheel 41 is dependent upon the particular mounting of pin 43 in the index holes 44 of the wheel 41, while the frequency of oscillation is dependent upon the output speed of reducer 47 as controlled by hand wheel 49. Encompassing the upper plate 8 and lower plate 9 is a pair of spaced housings 50 and 51 which are movable into engagement with each other along with the upper and lower plate members 8 and 9 to define an air pressure dome chamber 52. Lower housing 51 has a splined connection as at 53 to the shaft 13 to permit relative vertical movement with respect thereto while preventing rotation therebetween. An annular seal 54 is located between housings 51 and 52 and a seal 55 is located on shaft 13 between shafts 13 and housing 51 to assure an air-tight chamber 52. Mounted on shaft 40 is a torque sensing pick-up device 56 which responds to torque forces in shaft 40 to actuate a torque recorder 57 through electrical lines 58 and 59. Such pick-up device 56 may comprise a bonded resistance wire strain gauge, well known in the art and therefore neither illustrated or described in detail, wherein such wire gauges are bonded to the shaft 40 in such a position, and are so connected into a bridge circuit, that they cancel the effects of bending and thrust strains while adding the effect of torsional strain, with the relation between bridge unbalance and torsional strain being linear. A pick-up device such as this is manufactured by the Baldwin-Lima-Hamilton Corporation, located in Waltham, Massachusetts, and is known as a type B torque pick up which has a nominal full scale output of 1.5 mv. per volt input.

The electrical power for the control operation is supplied by electric lines 60 and 61 which are connected to a source of electrical power not shown. A double pole, single throw switch 62 connects lines 60 and 61 to main control lines 63 and 64 which lead to the torque pick-up recorder 57. Motor 48 receives its power supply from the lines 63 and 64 via branch lines 65 and 66. Branch lines 67 and 68 from lines 63 and 64 are connected to solenoid 27 while branch lines 69 and 70 supply power to a platen temperature control unit 71 which in turn is connected to heating coils 72 and 73 embedded in the upper and lower plate members 8 and 9 respectively. Also embedded in plate members 8 and 9 are thermocouples not shown to sense the temperature of the material confined thereon. Such thermocouples may be connected to a suitable temperature recorder in a manner well known in the art.

A conduit 75 is connected to the air dome 52 via the lower housing 51 through a suitable control valve member 76 which is adapted to supply pressurized air from a source not shown into such chamber to control the pressure therein. Air pressure from a suitable source is also connected to the cylinder 15 via conduit 77 which is adapted to be regulated in a manner well known in the art to maintain a predetermined pressure on piston 14 in such cylinder 15. A gauge 78 is located on such conduit to register the pressure in such chamber. Shaft 13 has a laterally extending bracket 79 which is adapted to be engaged by the stem of a gauge 80, which gauge 80 indicates the amount of clearance between the upper and lower plates. A load cell 81, similar to cell 56, comprising a bonded resistance wire strain gauge, well known in the art and therefore neither illustrated nor described in detail has suitable wire gauges bonded to shaft 17 in such a position and so connected into a bridge circuit as to register normal load and its variation due to the oscillating shear strain. This normal thrust or load is due to elastic effects of rubber during cure between the lower plate member 9 and the upper plate member 8.

In the operation of the apparatus described, the operator presets plate members 8 and 9 by closing the main control switch 62 and switch 82 located in lines 64, 63, and 69 and 70 respectively and setting control knob 83 in platen control unit 71 for the desired temperature. The operator then takes a sample of material 84 to be tested and places such material on the lower plate member or die member 9.

Solenoid operated valve 32 is then energized, moving such piston rod 23 with respective pistons 24 and 25 to the positions shown in FIGURE 1 wherein pressurized fluid is directed from a suitable source via conduit 21 and conduit 31 to the lower portion of cylinder 19 to thereby pressurize such chamber and move piston 17 upwardly along with cylinder 15, bracket 16 and lower plate member 9 upwardly such that the sample of material 84 is compressed between die members 8 and 9 along with the end rings 10 and 11. After the respective plate members firmly engage the sample, the operator closes switch 85 to energize motor 48, thereby causing shearing member 8 to rotatably oscillate with respect to the lower stationary plate member 9. Simultaneously with such action, a suitable control valve connected to conduit 77 is actuated to maintain a predetermined pressure in cylinder 15 which maintains a predetermined pressure between the respective plate members 8 and 9 while conduit 75 maintains a predetermined pressure in the chamber defined by housings 50, 51 and the plate members 8 and 9. As plate member 8 oscillates in each direction, the shearing forces over the surface of the sample of material are transmitted to shaft 40 where they are sensed as torque by the torque cell 56 whose signal is transmitted via lines 58 and 59 to a recorder 57 which records the torque as a graph on a moving chart 86. By varying the frequency of the oscillation of the shearing member 8, the amplitude by means of changing the setting of pin 43 of the index holes 44 of wheel 41 and the temperature, the output signal from the torque sensing means, pick-up device 56 will sense the variation in characteristics of the sample. During such action, load cell 81 will provide an output signal which may be similarly recorded to indicate the normal thrust during cure as indicated on the chart 86b. Because the geometry of the specimen is a right cylinder, the absolute value of shear modulus and other elastic constants may be measured in contradistinction to the values measured in instruments such as a three piece test instrument having a rotor embedded in the specimen where they are end effects in the shearing action due to the undefined geometry of undetermined magnitude.

A modification of the originally described embodiment is shown in FIGURES 3 and 4, wherein the upper plate member 90 is similar in all respects to the upper plate 8 being connected to a driven shaft 91 which is oscillated in the same manner as shaft 40; however, such shaft 91 has no torque sensing pick-up device thereon, however having a laterally extending rod 92 secured thereto for contact with a gauge 93 to indicate the angle of rotation of the shaft 91. In lieu of gauge 93, a torque sensing pick-up device may be mounted on shaft 91. Lower plate member 95 is connected to a shaft 96 which has a piston 97 connected thereto and slidably mounted in cylinder 98 similar in all respects to the previously described piston 14 and cylinder 15. Cylinder 98 is moved in a vertical direction in a similar manner as the previously described embodiment and accordingly is not shown. Cylinder 98 is operatively connected to a shaft 99 which has mounted thereon a load cell 100 similar to load cell 81 of the previously described embodiment. A conduit 101 interconnects cylinder 98 with a suitable pressure source for controlling the pressurization thereof. A dial 102 is mounted on conduit 101 to indicate the pressure in the chamber between pistons 97 and cylinder 98. The pressure in chamber 103 is operative to maintain a predetermined pressure on the test specimen to be described. Cylinder 98 has a plurality of laterally extending spiders 104 which are operatively connected to an annular ring portion 105 which has secured to it upwardly extending brackets 106 whose upper end portion thereof secures an annular housing 107 which closely receives the lower plate member 95 at its central recessed portion 108. Shaft 96 extends upwardly from piston 97 through housing 107 and connected to upper plate member 95. Housing 107 is annularly recessed at its upper inner periphery to provide a shoulder 109 to receive a square cross-sectioned annular heat resistant rubber ring 110. Rubber ring 110 is bonded to the upper outer peripheral portion of plate member 95 and the upper inner peripheral portion of housing 107. The lower periphery of upper plate member 90 has an annular end ring 114 suitably secured thereto which is adapted to abuttingly engage the ring 112 to define a chamber which is adapted to receive a specimen 115 to be tested. As seen in FIGURE 4, shaft 96 has a laterally extending rod 116 which has suitably secured thereto a stem member 117 of a tension compression load cell 118 operative to measure torque. Such cell 118 is suitably mounted and secured to one of the radial arms 104 of spider 105. Shaft 96 has secured to it a laterally extending arm 119 which is adapted to be engaged by a deflection gauge 120 which is suitably mounted on a bracket and adapted to measure the vertical clearance space between lower plate member 95 and upper plate member 90. Upper plate member 90, lower plate member 95, and housing 107 have suitable heaters mounted therein to maintain predetermined temperature on such members to maintain the chamber defined by the upper and lower plate members at a predetermined set temperature. Suitable thermostats and controls are used for maintaining such constant temperatures.

The operation of this embodiment is similar to the operation of the first embodiment; however, herein with the load cell measuring torque on the lower shaft there is provided a more precise reading of the torque since the magnitude of twisting of the upper shaft is of small magnitude by comparison to the first described embodiment. Thus structure of locating the load cell 100 and the torque measuring cell 118 on the lower portion of the test instrument allows the actual true shear stroke or strain to be measured. Any twist or take-up shaft 91 is negligible; however, any small amount can be measured on gage 93.

A further modification of the original embodiment is shown in FIGURE 5 which would be similar in all respects as that described in FIGURE 4 except that the end ring 114 is adapted to abuttingly engage a recess in the upper surface portion of housing 107 to define a closed chamber between the upper and lower plate members 90, 95 and the end ring 122.

Figure 6:
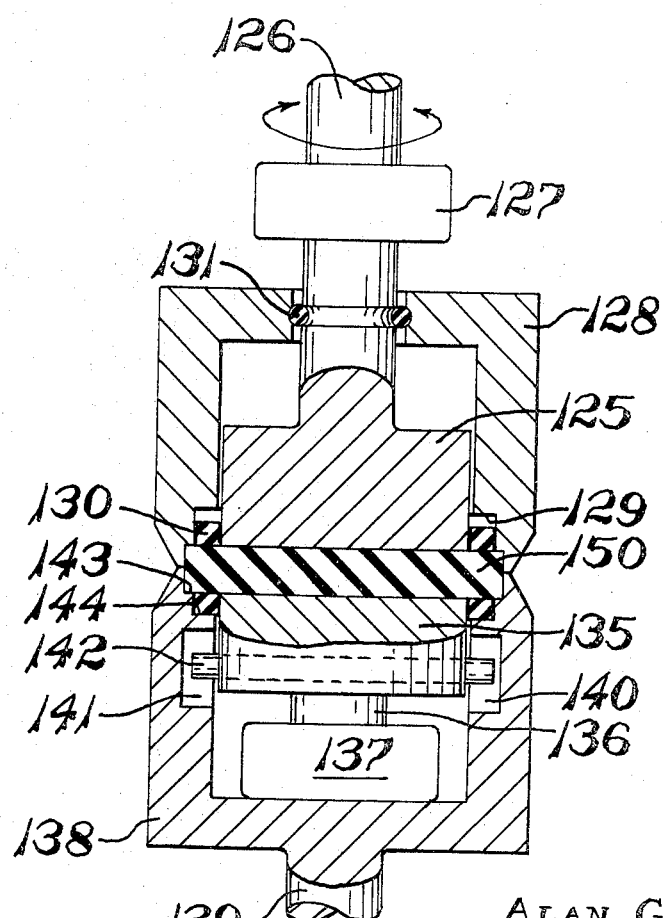
FIGURE 6 is another *modified* side elevational view of the basic testing apparatus shown in FIGURE 1.

A further modification or embodiment is shown in FIGURE 6 wherein the upper plate member 125 is similar in all respects to the upper plate 8 and is connected to a driven shaft 126 for oscillation thereby. Shaft 126 has torque pick-up sensing device 127 which is adapted to be connected to a torque recorder as in the original embodiment to record the torque as impressed on such shaft 126. Encompassing the upper plate member 125 is a cylindrical cup-shaped member 128 having an annular recessed portion 129 at its lower end portion which is adapted to receive an annular square cross-section rubber ring 130 which is bonded to the outer peripheral surface of the upper plate member 125 and the inner peripheral surface of the cup-shaped cylinder member 128. A standard bearing shaft assembly designated 131 is mounted between cylinder 130 and shaft 126 to take the normal load. Upper plate member 125 has heaters suitably located therein as in the previously described embodiment. A lower plate member 135 is connected to a downwardly extending shaft member 136 which abuttingly engages a load cell 137, which load cell 137 is secured to a cup-shaped housing 138. Housing 138 has a downwardly extending shaft member 139, similar in all respects to the previously described shaft 13 of the first embodiment or shaft 96 of the embodiment shown in FIGURE 3 which is operated by hydraulic cylinder or pneumatic means to raise such plate member upwardly to clamp a test sample between the plate members 125 and 135. Housing 138 has a pair of spaced recessed portions 140 and 141 on its inner periphery which receives the respective end portions of a key 142 which extends through a slot in lower plate member 135 to prevent relative rotation therebetween but permits relative vertical movement as viewed in FIGURE 6. The upper end portion of housing 138 is suitably recessed to provide a pair of stepped shoulders 143 and 144 wherein such latter shoulder abuttingly receives an annular square cross-sectioned rubber ring which is bonded thereto and has its inner peripheral portion bonded to the lower plate member 135. Lower housing 138 and upper housing 128 have their respective upper and lower surfaces respectively suitably milled to provide abutting engagement therebetween to define a sealed chamber in cooperation with the upper plate member 125 and the lower plate member 135. Such chamber provides a sealed cavity for a rubber specimen designated 150. The shear stress-strain properties may be measured through the rotation of the upper plate member 125 and as measured by the torque pick-up sensing device 127 and the load cell 137.

We claim:

1. An apparatus for determining physical properties of solid and chemically blown vulcanizable elastomeric material comprising a pair of plate members with flat planar surfaces, each plate member having an annular peripheral ring, said plate members and said rings cooperative to hold a test sample for testing such materials, housing means encompassing said plate members to provide a closed air dome, means to move one of said plate members to and from the other of said plate members to exert and maintain a predetermined pressure thereon; a drive shaft extending outwardly from said other plate member, drive means connected to said drive shaft and operative to impose an oscillatory motion on said other plate member and a shearing strain on the material being tested, means to heat said plate members to a predetermined temperature, and means mounted on said drive shaft for measuring the force required to oscillate said other plate member.

2. An apparatus as set forth in claim 1 wherein load responsive means are connected to said one member for measuring variations in normal shearing forces, and recording means connected to said means for measuring said force to oscillate said other plate member and to said load responsive means for recording the outputs therefrom.

3. An apparatus as set forth in claim 1 wherein gauge means are connected to said drive shaft betweeen said means for measuring the force required to oscillate said other plate and the upper portion of said other plate to register the deflection of said drive shaft with each oscillation thereof.

4. An apparatus for determining physical properties of solid and chemically blown vulcanizable elastomeric material comprising a pair of plate members cooperative to confine a test sample for testing such materials, means to move one of said plate members to and from the other of said plate members to exert and maintain a predetermined pressure thereon, drive means connected to said other plate member and operative to impose an oscillatory shearing strain on said other plate member and on the material being tested, means for measuring the force required to oscillate said other plate, load responsive means connected to said one member and cooperative therewith to indicate variations in normal shearing forces, recording means connected to said load responsive means, said one plate member has an upper surface of lesser area than the lower surface of said other plate member, said plate members are cooperative to define a closed chamber, each of said plate members has a housing, said housings are cooperative upon movement of said plate members closely adjacent to each other to abuttingly engage each other and define a closed air chamber, and resilient means interconnecting said plate members to their corresponding housings to provide relative rotation therebetween.

5. An apparatus as set forth in claim 4 wherein said one plate member is movable in a vertical direction relative to its said corresponding housing.

6. An apparatus as set forth in claim 5 wherein load responsive means are connected to said one plate member and cooperative therewith to indicate variations in normal shearing forces, and recording means connected to said load responsive means.

7. An apparatus for determining the increase in shearing stress during cure comprising: a pair of spaced plate members with planar serrated surfaces; each of said plate members having an annular ring on its outer peripheral portions; said plate members and said rings cooperative to define a test chamber; means to move one of said plate members toward the other plate member to position one of said ring members into abutting contact with the other of said ring members and operative to maintain a predetermined pressure on a test sample positioned between said plate members; means to heat said plate members; drive means having a preselected constant input operatively connected to said other plate member for imposing an oscillatory rotary strain and motion thereto; and means connected to said other plate member for registering torsional resistance in a test specimen held between said plate members and subjected to oscillating rotary motion.

8. An apparatus for determining the increase in shearing stress as set forth in claim 7 wherein said one plate member has gauge means connected thereto operative to measure normal shearing forces.

9. An apparatus for determining the increase in shearing stress as set forth in claim 8 wherein each of said plate's members have a U-shaped housing; said housing cooperative with each other to define a closed air chamber upon movement of said plate members toward each other; and means connected to said air chamber to provide pressurized air thereto to prevent a porous cure in such test specimen.

10. An apparatus for determining physical properties of solid and chemically blown elastomeric materials comprising a pair of plate members with flat annular surfaces, a cylindrical member with a central recessed portion encompassing one of said plate members, said one plate member resiliently connected to said cylindrical member at the outer periphery of said one plate member, the other of said plate members having an outer annular ring, said annular ring and said plate members together with a portion of said cylindrical member cooperative to define a closed cavity and to confine a test sample for testing such materials, means to move said one plate member to and from said other plate members to exert and maintain a predetermined pressure thereon; drive means connected to said other plate member and operative to impose an oscillatory mottion on said other plate member and an oscillatory shearing strain on the material being tested, and load and torque measuring means operatively connected to said one plate member for measuring normal thrust and torque on said one plate member due to exertion of forces by such test sample.

11. An apparatus for determining physical properties of solid and chemically blown elastomeric materials as set forth in claim 8 wherein gauge means are operatively connected to said drive means to measure the angle of rotation thereof.

12. An apparatus for determining physical properties of vulcanizable elastomeric material comprising: a pair of spaced cup-shaped housings, means to move one of said cup-shaped housings to and from the other of said cup-shaped housings, said one cup-shaped housing having a pair of diametrically opposed slots, said one housing having a die member located therein and being resiliently bonded thereto, said die member having a pair of laterally extending pins received by said slots to permit relative vertical movement therebetween, a load cell located between said die member and said one housing to register axial loads thereon, said other cup-shaped housing having a die member resiliently held therein, means to heat said die members to a predetermined temperature, drive means connected to said die member of said other cup-shaped member operative to impose an oscillatory shearing strain on said die member of said other cup-shaped member and on the material being tested, measuring means connected to said load cell for measuring axial thrust thereon, and torque measuring means connected to said die member of said one cup-shaped member to register the torque thereon.

13. An apparatus for determining the increase in shearing stress during cure comprising a pair of spaced test engaging members mounted on a support frame, one of said members movable toward and away from the other of said members, the lower surface of said other member cooperative with and adjacent to the upper surface of said one member to engage a test sample therebetween, power operated means connected to said one member operative to provide and maintain a preselected thrust on said one member and thereby a preselected load on a test specimen retained between said test engaging members, drive means operatively connected to said other engaging member for imposing an oscillatory rotary motion thereto, a housing encompassing said one engaging member having its upper annular surface lying coplanar with said upper surface of said one engaging member, said lower surface being of greater area than said upper surface, resilient means interconnecting said housing and said one member, and measuring means connected to said other test engaging member to register the torque thereon.

14. An apparatus for determining the increase in shearing stress as set forth in claim 13 wherein said other member has a ring member along its outer periphery, said housing having an annular member mounted thereon in alignment with said ring member, and said ring member abuttingly engaging said annular member and cooperative with said test engaging members and a portion of said upper annular surface of said housing to define a closed test chamber.

15. An apparatus for determining the increase in shearing stress as set forth in claim 14 wherein gauge means interconnect said support frame and said one engaging member operative to register the clearance space between said upper surface and said lower surface.

16. An apparatus for determining the increase in shearing stress as set forth in claim 14 wherein load measuring means are connected to said one engaging member for measuring the oscillating normal thrust on the test speciment during cure.

References Cited

UNITED STATES PATENTS

| 2,037,529 | 4/1936 | Mooney | 73—101 |
| 3,182,494 | 5/1965 | Beatty et al. | 73—101 |

FOREIGN PATENTS

| 1,006,354 | 9/1965 | Great Britain. |

CHARLES A. RUEHL, Primary Examiner

JOHN K. LUNSFORD, Assistant Examiner